(12) United States Patent
Villalpando-Paez et al.

(10) Patent No.: US 11,732,174 B2
(45) Date of Patent: *Aug. 22, 2023

(54) THERMALLY CONDUCTIVE POLYMER COMPOSITIONS CONTAINING CARBON BLACK

(71) Applicant: Cabot Coporation, Boston, MA (US)

(72) Inventors: Federico Villalpando-Paez, San Francisco, CA (US); George D. Eid, Nashua, NH (US); Alyson M. Christopher, San Jose, CA (US); Mark J. Hampden-Smith, Chelmsford, MA (US); Santiague Pierre, Liege (BE); Alain Thielen, Thimister (BE); Limeng Chen, Arlington, MA (US); Agathagelos Kyrlidis, Cambridge, MA (US); Bruce E. MacKay, Framingham, MA (US)

(73) Assignee: Cabot Corporation, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/734,961

(22) Filed: May 2, 2022

(65) Prior Publication Data

US 2022/0290028 A1 Sep. 15, 2022

Related U.S. Application Data

(63) Continuation of application No. 16/073,820, filed as application No. PCT/US2017/014839 on Jan. 25, 2017, now Pat. No. 11,352,536.

(60) Provisional application No. 62/289,623, filed on Feb. 1, 2016.

(51) Int. Cl.

| | | |
|---|---|---|
| *C09K 5/14* | (2006.01) | |
| *C08K 3/04* | (2006.01) | |
| *C08K 3/38* | (2006.01) | |
| *C08J 3/22* | (2006.01) | |
| *C09C 1/56* | (2006.01) | |
| *C09C 1/48* | (2006.01) | |

(52) U.S. Cl.
CPC .............. *C09K 5/14* (2013.01); *C08J 3/22* (2013.01); *C08K 3/04* (2013.01); *C08K 3/38* (2013.01); *C08K 2003/385* (2013.01); *C08K 2201/001* (2013.01); *C09C 1/48* (2013.01); *C09C 1/56* (2013.01)

(58) Field of Classification Search
CPC .... C09K 5/14; C09K 3/04; C09C 1/48; C09C 1/56; C09C 1/50
USPC .................. 252/75; 106/472, 478, 473, 31.9
See application file for complete search history.

(56) References Cited

U.S. PATENT DOCUMENTS

| | | |
|---|---|---|
| 2,068,447 A | 1/1937 | Cox |
| 2,149,671 A | 3/1939 | Franck |
| 3,379,673 A | 4/1968 | Rossman |
| 3,408,164 A | 10/1968 | Johnson |
| 4,061,719 A | 12/1977 | Schallus et al. |
| 4,097,656 A | 6/1978 | Dany et al. |
| 4,098,968 A | 7/1978 | Wortmann et al. |
| 4,160,813 A | 7/1979 | Markel et al. |
| 4,231,919 A | 11/1980 | Isaacson |
| 4,273,697 A | 6/1981 | Sumimura et al. |
| 4,329,329 A | 5/1982 | Dolkemeyer et al. |
| 4,351,815 A | 9/1982 | Glasstetter et al. |
| 4,374,113 A | 2/1983 | Yates et al. |
| 4,391,941 A | 7/1983 | Cotton et al. |
| 4,459,273 A | 7/1984 | Dolkemeyer et al. |
| 4,493,788 A | 1/1985 | Fujie et al. |
| 4,518,434 A | 5/1985 | Wilder |
| 4,526,952 A | 7/1985 | Zeitler et al. |
| 4,543,240 A | 9/1985 | Goldberger |
| 4,601,887 A | 7/1986 | Dorn et al. |
| 4,624,003 A | 11/1986 | Eirich et al. |
| 4,693,879 A | 9/1987 | Yoshimura et al. |
| 4,698,913 A | 10/1987 | Voll |
| 4,702,860 A | 10/1987 | Kinderov et al. |
| 4,842,943 A | 6/1989 | Kobayashi et al. |
| 4,927,718 A | 5/1990 | Ross, Jr. |
| 5,317,592 A | 5/1994 | Van Staden |
| 5,579,334 A | 11/1996 | Baxter et al. |
| 5,798,405 A | 8/1998 | Zimmer et al. |
| 6,086,792 A | 7/2000 | Reid et al. |
| 6,157,667 A | 12/2000 | Johansen et al. |
| 6,331,586 B1 | 12/2001 | Thielen et al. |
| 6,482,386 B2 | 11/2002 | Atchetee et al. |

(Continued)

FOREIGN PATENT DOCUMENTS

| | | |
|---|---|---|
| CA | 2226277 | 3/2008 |
| DE | 3339700 A1 | 6/1984 |

(Continued)

OTHER PUBLICATIONS

Ayala, J.A., et al., "Carbon-Black-Eastomer Interaction II: Effects of Carbon Black Surface Activity and Loading", Rubber Chemistry and Technology, vol. 66, pp. 772-805.
Wang, M., "Application of Inverse Gas Chromatography to the Study of Rubber Reinforcement", in *Powders & Fibers: Interfacial Science and Applications*, Nardin and Papirer, eds., Taylor & Francis Group, LLC, 2007, pp. 123-167.
Schaeffer, W.D., et al., "Structure and Properties of Carbon Black", Industrial and Engineering Chemistry, Aug. 1953, pp. 1721-1725.
Barsukov, I., et al., "Novel materials for electrochemical power sources—introduction of PUREBLACK Carbons", *J. of Power Sources* 153 (2006), pp. 288-299.

(Continued)

*Primary Examiner* — Jane L Stanley

(57) ABSTRACT

A composite polymer composition comprising partially crystallized carbon black. The composition exhibits superior thermal transfer properties in plastic formulations. The polymer precursor exhibits excellent rheology when compared to similar compositions comprising traditional carbon blacks. The composite polymers provide for higher loading of more thermally conductive carbon blacks in a variety of composite polymer compositions.

19 Claims, 4 Drawing Sheets

(56) References Cited

U.S. PATENT DOCUMENTS

| | | | |
|---|---|---|---|
| 6,528,556 | B1 | 3/2003 | Herbst et al. |
| 6,649,300 | B2 | 11/2003 | Ito et al. |
| 6,689,505 | B1 | 2/2004 | Albers et al. |
| 6,780,388 | B2 | 8/2004 | Masuko et al. |
| 6,825,262 | B2 | 11/2004 | Görl et al. |
| 7,150,840 | B2 | 12/2006 | Yamamoto et al. |
| 7,217,405 | B2 | 5/2007 | Karl |
| 7,378,468 | B2 | 5/2008 | Lechtenboehmer |
| 7,462,309 | B2 | 12/2008 | Miller et al. |
| 7,485,280 | B2 | 2/2009 | Matsuki et al. |
| 7,569,161 | B2 | 8/2009 | Nagao et al. |
| 7,722,713 | B2 | 5/2010 | Green et al. |
| 7,879,261 | B2 | 2/2011 | Oriji et al. |
| 8,029,876 | B2 | 10/2011 | Park et al. |
| 8,062,557 | B2 | 11/2011 | Takagi et al. |
| 8,308,990 | B2 | 11/2012 | Oriji et al. |
| 8,420,044 | B2 | 4/2013 | Bergemann et al. |
| 8,480,930 | B2 | 7/2013 | Suh et al. |
| 8,552,101 | B2 | 10/2013 | l'Abee et al. |
| 8,586,650 | B2 | 11/2013 | Zhang et al. |
| 8,895,142 | B2 | 11/2014 | Kyrlidis et al. |
| 8,932,482 | B2 | 1/2015 | Atanassova et al. |
| 9,085,723 | B2 | 7/2015 | Myllymaki et al. |
| 2001/0031823 | A1 | 10/2001 | Atchetee et al. |
| 2003/0108481 | A1 | 6/2003 | Igarashi et al. |
| 2003/0176562 | A1 | 9/2003 | Rafailovich et al. |
| 2004/0013599 | A1 | 1/2004 | Bhatt |
| 2004/0110005 | A1 | 6/2004 | Choi et al. |
| 2005/0063892 | A1 | 3/2005 | Tandon et al. |
| 2005/0063893 | A1 | 3/2005 | Ayala et al. |
| 2005/0070658 | A1 | 3/2005 | Ghosh et al. |
| 2005/0148721 | A1 | 7/2005 | Tonapi et al. |
| 2007/0179232 | A1 | 8/2007 | Collins et al. |
| 2009/0208751 | A1 | 8/2009 | Green et al. |
| 2010/0170889 | A1 † | 7/2010 | Keite-Telgensuscher |
| 2010/0316821 | A1 | 12/2010 | Chang et al. |
| 2012/0157600 | A1 | 6/2012 | Saga |
| 2012/0214000 | A1 | 8/2012 | Kyrlidis et al. |
| 2013/0157140 | A1 | 6/2013 | Bartling et al. |
| 2013/0214211 | A1 | 8/2013 | Lehmann et al. |
| 2013/0266837 | A1 | 10/2013 | Lee et al. |
| 2013/0295462 | A1 | 11/2013 | Atanassova et al. |
| 2014/0120339 | A1 | 5/2014 | Nikova et al. |
| 2014/0171575 | A1 † | 6/2014 | Mercx |
| 2014/0217656 | A1 | 8/2014 | Agarwal |
| 2014/0377659 | A1 | 12/2014 | Oljaca |
| 2015/0034858 | A1 | 2/2015 | Raman et al. |
| 2015/0368439 | A1 | 12/2015 | Wu et al. |
| 2016/0122611 | A1 | 5/2016 | Yoshida et al. |
| 2020/0165469 | A1 | 5/2020 | Horikoshi et al. |

FOREIGN PATENT DOCUMENTS

| | | | |
|---|---|---|---|
| EP | 0307205 | A2 | 3/1989 |
| EP | 1164651 | A1 | 12/2001 |
| EP | 1288161 | A1 | 3/2003 |
| EP | 1309024 | A2 | 5/2003 |
| EP | 1726619 | A1 † | 11/2006 |
| EP | 1790693 | A1 | 5/2007 |
| EP | 2610299 | A1 | 7/2013 |
| EP | 2585517 | B1 | 12/2014 |
| EP | 2937388 | A1 | 10/2015 |
| GB | 1144160 | | 3/1969 |
| JP | 57138296 | A | 8/1982 |
| JP | 59122555 | A | 7/1984 |
| JP | 60009060 | A | 1/1985 |
| JP | 61012753 | A | 1/1986 |
| JP | S6143659 | A | 3/1986 |
| JP | 61066759 | A | 4/1986 |
| JP | 61185544 | A | 8/1986 |
| JP | 61254645 | A | 11/1986 |
| JP | 10060169 | A | 3/1998 |
| JP | 11172146 | A | 6/1999 |
| JP | 2005/060581 | | 3/2005 |
| JP | 2006/321564 | | 11/2006 |
| JP | 2015/006980 | A | 1/2015 |
| JP | 2018/008828 | | 1/2018 |
| KR | 2001/0049450 | A | 6/2001 |
| WO | WO 2001/021393 | A1 | 3/2001 |
| WO | WO 03/017289 | A1 | 2/2003 |
| WO | WO 2004/076548 | A2 | 9/2004 |
| WO | 2005028569 | A1 † | 3/2005 |
| WO | WO 2005/028569 | A2 | 3/2005 |
| WO | WO 2010/068339 | A1 | 6/2010 |
| WO | WO 2012/040058 | A1 | 3/2012 |
| WO | WO 2013/096784 | A1 | 6/2013 |
| WO | 2014205210 | A1 † | 12/2014 |
| WO | 2014205215 | A1 † | 12/2014 |
| WO | WO 2014/202649 | A1 | 12/2014 |
| WO | WO 2014/203669 | | 12/2014 |
| WO | WO 2014/205210 | A1 | 12/2014 |
| WO | WO 2014/205215 | A2 | 12/2014 |
| WO | WO 2015/055552 | A1 | 4/2015 |
| WO | WO 2015/128843 | A2 | 9/2015 |

OTHER PUBLICATIONS

Ungár, T., et al., "Size and shape of crystallites and internal stresses in carbon blacks", *Composites Part A: Applied Sci and Manufacturing* 36 (2005), pp. 431-436.

Fröhlich, J, et al., "The effect of Filler-filler and filler-elastomer interaction on rubber reinforcement", *Composites Part A: Applied Sci and Manufacturing* 36 (2005), pp. 449-460.

The International Search Report and the Written Opinion of the Inbternational Searching Authority, or the Declaration of International Patent Application No. PCT/US2017/014839, dated May 12, 2017.

Kirk-Othmer Encyclopedia of Chemical Technology, Fifth Edition, vol. 4, pp. 761-803, John Wiley & Sons, Inc. (2004).

Product Information Denka Black® (Japanese), Denka Company Limited, Undated, and English translation.

Carbon Society of Japan, No. 247, pp. 75-79, 2011 (Japanese), and English translation of highlighted portions.

Printout from web.archive.org, printed Mar. 3, 2021, for website ; www.denka.co.jp/scm/product/scm/detail_063359, captured on Oct. 17, 2015 and translation of website text.

Zhao, et al., "Partially-crystallized carbon material obtained by the reducing reactions from alkalis carbonate and its electrical performance", *Materials Letters*, 61, 2007, 4722-4724. Published online Mar. 14, 2007 (Year: 2007).

Cheng, et al., "Effect of acid treatment on structure and morphology of carbons prepared from pyrolysis of poyfurfuryl alcohol", *J. Polym. Res.* 17, 2010, 391-399. Published online Jul. 21, 2009 (Year: 2009).

Joyce, George, "Advances in Structure Measurements of Carbon Black", The Newsletter of ASTM Committee D24 on Carbon Black, Summer 2009, vol. 9, No. 1, pp. 1-7.

Joyce, "Advances in Structure Measurements of Carbon Black", Newsletter of ASTM Committee D24, 2009.†

Denka Black historical archive printout from Wayback machine of Denka website dated Jul. 18, 2015.†

Denka Black screenshot of p. 1 from Denka website dated Jul. 18, 2015†

Denka Black printout from Denka website dated Nov. 30, 2020.†

Denka Black historical archive printout from Denka website dated May 13, 2013.†

† cited by third party

FIG. 5
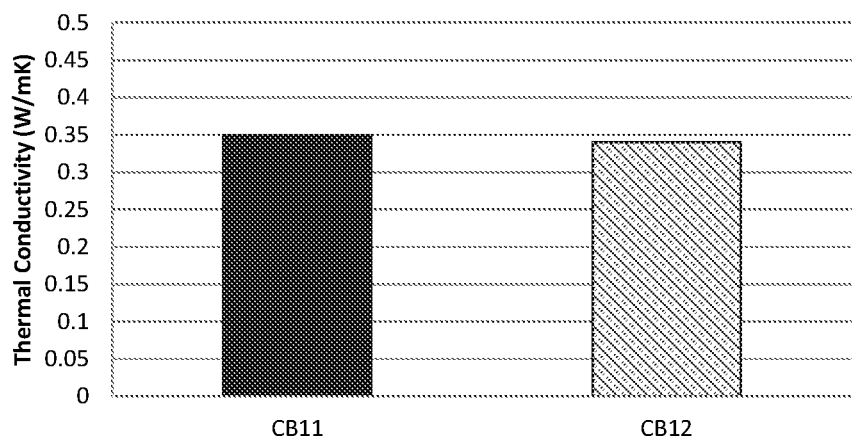
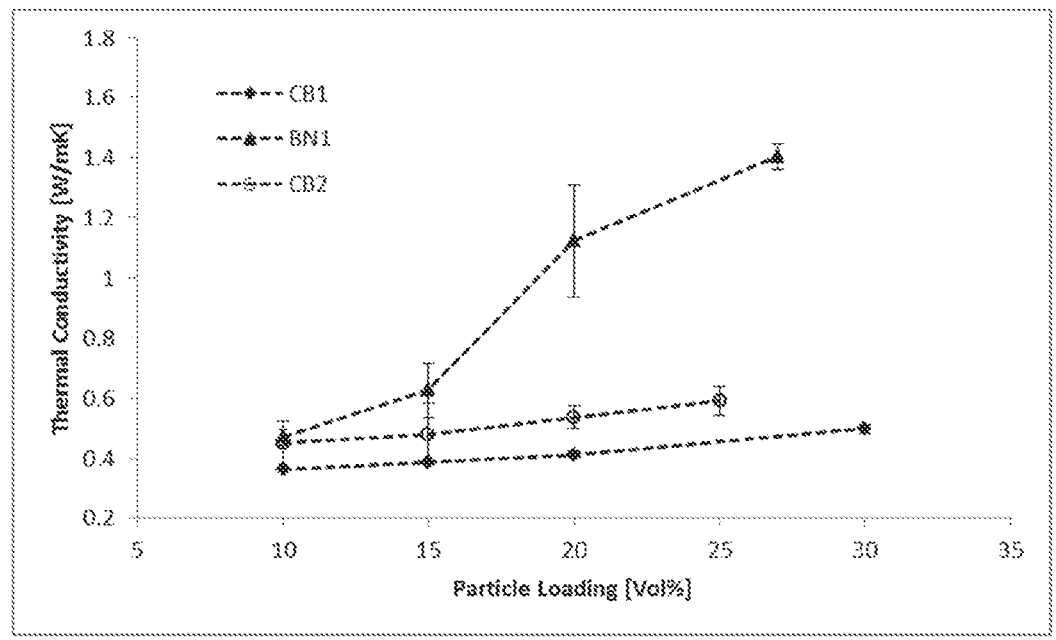
FIG. 6

US 11,732,174 B2

THERMALLY CONDUCTIVE POLYMER COMPOSITIONS CONTAINING CARBON BLACK

This application is a continuation of U.S. Ser. No. 16/073,820, filed Jul. 30, 2018, which is the national phase entry of PCT/US2017/014839, filed Jan. 25, 2017, which claims priority from U.S. Ser. No. 62/289,623, filed Feb. 1, 2016.

FIELD OF THE DISCLOSURE

The present disclosure relates to polymer compositions and, in particular, to plastics exhibiting improved thermal conductivity and mechanical properties.

BACKGROUND

Polymer systems that can benefit from improved heat transfer are used in a variety of fields including electronic, mechanical, automotive, aerospace and industrial applications. For example, conductive polymers can be used in wire and cable jacketing to dissipate heat from the cable core. Thermally conductive polymers can also replace materials such as metals or less thermally conductive materials that are typically used in applications that require efficient transfer of heat.

SUMMARY

In one aspect, a composite polymer composition is provided, the composite polymer composition comprising a polymer matrix and a partially crystallized carbon black dispersed in the polymer matrix at a concentration of from 12 to 28 percent by weight, wherein the carbon black has an OAN structure of greater than 120 cm$^3$/100 g and less than 200 cm$^3$/100 g, a surface energy of less than 8 mJ/m$^2$, a percent crystallinity of less than 65% and a Raman microcrystalline planar size ($L_a$) of greater than or equal to 28 Å. The partially crystallized carbon black can be formed by thermally treating a furnace black at a temperature greater than 700° C. and less than 1800° C. The composition can comprise a copolymer or terpolymer. The polymer composition can be a polyolefin, a polystyrene, a polycarbonate, a polyamide, and/or a polyamine. The carbon black can have a Raman microcrystalline planar size ($L_a$) of greater than or equal to 35 Å and a surface energy greater than 1 mJ/m$^2$. The polymer can be selected from thermoplastic polyolefins (TPO), polyethylene (PE), linear low density (LLDPE), low density (LDPE), medium density (MDPE), high density (HDPE), ultra-high molecular weight (UHMWPE), very low density polyethylene (VLDPE), metallocene medium density polyethylene (mLLDPE), polypropylene, copolymers of polypropylene, ethylene propylene rubber (EPR), ethylene propylene diene terpolymers (EPDM), acrylonitrile butadiene styrene (ABS), acrylonitrile EPDM styrene (AES), styrene-butadiene-styrene (SBS), polyoxymethylene (POM), polyamides (PA) polyvinylchloride (PVC), tetraethylene hexapropylene vinylidenefluoride polymers (THV), perfluoroalkoxy polymers (PFA), polyhexafluoropropylene (HFP), polyketones (PK), ethylene vinyl alcohol (EVOH), copolyesters, polyurethanes (PU), thermoplastic polyurethanes, polystyrene (PS), polycarbonate (PC), polybutylene terephthalate (PBT), polyethylene terephthalate (PET), polypheneylene oxide (PPO) and polyphenylene ether (PPE). The composition can be a masterbatch. The composition may further include a non-carbonaceous particle having a thermal conductivity greater than 30 W/mK, for example, boron nitride, magnesium oxide, zinc oxide, or alumina. The volume ratio of partially crystalized carbon black to the non-carbonaceous particle, e.g., boron nitride, may be from 1:1 to 1:10. The composite polymer composition may have a thermal conductivity at least 1.6× greater, at least 1.7× greater, or 2-4 times greater than the thermal conductivity of the polymer matrix. The partially crystallized carbon black may improve a thermal conductivity of the composite polymer composition at least 10% with respect to an untreated carbon black.

In another aspect, a polymer precursor composition is provided, the composition comprising a polymer precursor comprising a polymerizable monomer or oligomer and a partially crystallized carbon black dispersed in the monomer or oligomer at a concentration of from 12 to 28 percent by weight, wherein the carbon black has an OAN structure of greater than 120 cm$^3$/100 g and less than 200 cm$^3$/100 g, a surface energy of less than 8 mJ/m$^2$ and a Raman microcrystalline planar size ($L_a$) of greater than or equal to 28 Å. The polymer precursor may be a precursor of a polymer selected from a polyolefin, a polystyrene, a polycarbonate, a polyamide, and/or a polyamine. The polymer precursor can be a precursor of a polymer selected from thermoplastic polyolefins (TPO), polyethylene (PE), linear low density (LLDPE), low density (LDPE), medium density (MDPE), high density (HDPE), ultra-high molecular weight (UHMWPE), very low density polyethylene (VLDPE), metallocene medium density polyethylene (mLLDPE), polypropylene, copolymers of polypropylene, ethylene propylene rubber (EPR), ethylene propylene diene terpolymers (EPDM), acrylonitrile butadiene styrene (ABS), acrylonitrile EPDM styrene (AES), styrene-butadiene-styrene (SBS), polyoxymethylene (POM), polyamides (PA) polyvinylchloride (PVC), tetraethylene hexapropylene vinylidenefluoride polymers (THV), perfluoroalkoxy polymers (PFA), polyhexafluoropropylene (HFP), polyketones (PK), ethylene vinyl alcohol (EVOH), copolyesters, polyurethanes (PU), thermoplastic polyurethanes, polystyrene (PS), polycarbonate (PC), polybutylene terephthalate (PBT), polyethylene terephthalate (PET), polypheneylene oxide (PPO) and polyphenylene ether (PPE). The polymer precursor can be a precursor for a polymer selected from the group consisting of acrylics, epoxies, silicones, phenolics, polyimides, plastisols, and polyvinyl acetates. The polymer precursor can comprise a precursor of a polyolefin, a polystyrene, a polycarbonate, a polyamide, and/or a polyamine. The composition may further include a non-carbonaceous particle having a thermal conductivity greater than 30 W/mK, for example, boron nitride, magnesium oxide, zinc oxide, or alumina. The volume ratio of partially crystalized carbon black to the non-carbonaceous particle, e.g., boron nitride, may be from 1:1 to 1:10. The polymer precursor composition, following polymerization, may have a thermal conductivity at least 1.6× greater, at least 1.7× greater, or 2-4 times greater than the thermal conductivity of a polymerizate of the polymer precursor. The partially crystallized carbon black may improve a thermal conductivity of a polymerizate of the polymer precursor composition by at least 10% with respect to an untreated carbon black.

In another aspect, the composite polymer composition or polymer precursor composition includes a carbon black having a Raman microcrystalline planar size ($L_a$) of greater than 29, 30, 31 or 35 Å and/or less than 65, 60, 55, 50 or 45 Å. The surface energy of the carbon black can be less than 4, less than 3 or less than 2 mJ/m$^2$ and/or greater than 0 mJ/m$^2$. The carbon black can have a percent crystallinity of greater than or equal to 35%, 40%, 45%, 50%, 55% or 60%.

The BET surface area of the carbon black can be less than 425+/−25, less than 300, less than 250, from 40 to 400 m$^2$/g, from 46 to 400 m$^2$/g, from 40 to 300 m$^2$/g, or from 40 to 200 m$^2$/g. The composite polymer composition or polymer precursor composition can be used to make products such as wire and cable jacketing, 3D printed products, automotive parts, and LED casings and fixtures. The carbon black can exhibit a substantially polyhedral primary particle shape and may have an iodine number of less than 425 m$^2$/g, less than 350 mg/g, less than 300 mg/g, less than 250 mg/g or less than 200 mg/g. The carbon black can be an unmodified carbon black. The composite polymer composition or polymer precursor composition can include a second carbon black that may or may not be partially crystallized. The partially crystallized carbon black can be made by increasing the Raman microcrystalline planar size ($L_a$) of a base carbon black by greater than 5, greater than 10, greater than 15 or greater than 20 Å.

BRIEF DESCRIPTION OF THE DRAWINGS

FIG. 5 is a bar graph comparing the thermal conductivity of a fifth base carbon black with an embodiment of a partially crystallized carbon black derivative;

FIG. 6 provides a graph illustrating the thermal conductivity of three polymer composites, each including a different filler;

DETAILED DESCRIPTION

Figure 1:
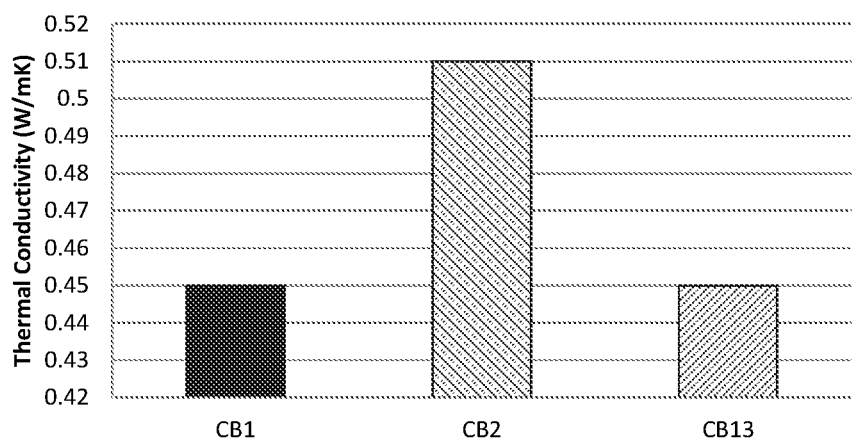
FIG. 1 is a bar graph comparing the thermal conductivity of a base carbon black with two embodiments of a partially crystallized carbon black derivative.

In one aspect a polymer system is provided that includes at least one polymer and at least one partially crystallized carbon black. Partially crystallized (also referred to as partially graphitized) carbon blacks exhibit higher crystallinity and lower surface energy than their corresponding base carbon blacks and, as described below, can provide improved thermal transfer capabilities compared to less crystalline forms of carbon black. As illustrated herein, partially crystallized carbon blacks can also improve the rheology of the polymer precursors that they are dispersed in when compared to similar systems using conventional carbon blacks. The polymer systems described herein may be any synthetic polymer in which a partially crystallized carbon black can be dispersed to improve thermal transfer efficiency. In addition, we have found that carbon blacks subjected to excess crystallization do not provide the enhanced thermal conductivity properties exhibited by less crystalline carbon blacks. That is, both insufficient and too much graphitization fail to provide the thermal conductivity benefits demonstrated by carbon blacks according to the embodiments disclosed herein.

Polymer compositions included both cured polymers and pre-polymer compositions. As used herein, a "polymer" or "polymer matrix" is the form of a polymer composition after it has been polymerized and may be suitable for use as a masterbatch, compound or otherwise to manufacture articles, for example, plastic articles As used herein, a "pre-polymer" is a polymer composition consisting of monomers or oligomers that have not yet been polymerized. The polymers may be polymers that are cured by methods known to those of skill in the art including heat, radiation, solvent evaporation, chemical catalysis or vulcanization. The polymers may be based on one, two, three or multi part pre-polymer systems. A "polymer composite" or "polymeric composite" is a material that includes at least one polymer and a second distinct component. The second component of the composite can be particles, fibers, pigments or a second polymer where the second polymer is distinct and not homogenously mixed with the first polymer.

In some embodiments, the polymer(s) can be a thermoplastic polymer or a thermosetting polymer. The polymer system can be a plastic. These plastic systems can be selected from those that are molded, extruded, coated, rolled or otherwise shaped into polymeric components. Further, the polymer group can be a homopolymer, copolymer, terpolymer, and/or a polymer containing one, two, three or more different repeating units. Further, the polymer group can be any type of polymer group, such as a random polymer, alternating polymer, graft polymer, block polymer, star-like polymer, and/or comb-like polymer. The polymer group can also be one or more polyblends. The polymer group can be an interpenetrating polymer network (IPN); simultaneous interpenetrating polymer network (SIN); or interpenetrating elastomeric network (IEN).

Specific examples of polymers include, but are not limited to, linear-high polymers such as polyethylene, poly(vinylchloride), polyisobutylene, polystyrene, polycaprolactam (nylon), polyisoprene, and the like. Other general classes of polymers suitable for use include polyamides, polycarbonates, polyelectrolytes, polyesters, polyethers, epoxies, polyanhydrides, (polyhydroxy)benzenes, polyimides, polymers containing sulfur (such as polysulfides, (polyphenylene) sulfide, and polysulfones), polyolefins, polymethylbenzenes, polystyrene and styrene copolymers (ABS included), acetal polymers, acrylic polymers, acrylonitrile polymers and copolymers, polyolefins containing halogen (such as polyvinyl chloride and polyvinylidene chloride), fluoropolymers, ionomeric polymers, polymers containing ketone group(s), liquid crystal polymers, polyamide-imides, polymers containing olefinic double bond(s) (such as polybutadiene and polydicyclopentadiene), polyolefin copolymers, polyphenylene oxides, polysiloxanes, poly(vinyl alcohols), polyurethanes, thermoplastic elastomers, and the like. In some embodiments, the polymer is a polyolefin, a polyurethane, a polystyrenic, a polyacrylate, a polyamide, a polyester, or mixtures thereof. Particularly suitable polymers include polyolefins and polyamides.

In certain embodiments the polymer can be, for example, a polyolefin, a vinylhalide polymer, a vinylidene halide polymer, a perfluorinated polymer, a styrene polymer, an amide polymer, a polycarbonate, a polyester, a polyphenyleneoxide, a polyphenylene ether, a polyketone, a polyacetal, a vinyl alcohol polymer, or a polyurethane. Useful polymers or resins include PET or polyethylene terephthalate, polystyrene, PBT or polybutylene terephthalate and PBT alloys, polypropylene, polyurethane, styrene-acrylonitrile copolymer, ABS or acrylonitrile-butadiene-styrene terpolymer, PVC or polyvinyl chloride, polyesters, polycarbonates, PP/PS or polypropylene polystyrene alloys, nylon, polyacetal, SAN or styrene acrylonitrile, acrylics, cellulosics, polycarbonate alloys and PP or propylene alloys. Other combinations of these materials may be used.

Various polymers can be combined with partially crystallized carbon blacks to form composite polymers. The composite polymers may include thermoplastic polyolefins (TPO), polyethylene (PE, such as linear low density (LLDPE), low density (LDPE), medium density (MDPE), high density (HDPE), ultra-high molecular weight (UHMWPE), very low density polyethylene (VLDPE), metallocene and medium density polyethylene (mLLDPE), polypropylene, copolymers of polypropylene, ethylene propylene rubber (EPR), ethylene propylene diene terpolymers (such as EPDM), acrylonitrile butadiene styrene (ABS), acrylonitrile EPDM styrene (AES), styrene-butadiene-styrene (SBS), polyoxymethylene (POM), polyamides (PA, such as PA6, PA66, PA11, PA12, and PA46), polyvinylchloride (PVC), tetraethylene hexapropylene vinylidenefluoride polymers (THV), perfluoroalkoxy polymers (PFA), polyhexafluoropropylene (HFP), polyketones (PK), ethylene vinyl alcohol (EVOH), copolyesters, polyurethanes (PU), thermoplastic polyurethanes, polystyrene (PS), polycarbonate (PC), polybutylene terephthalate (PBT), polyethylene terephthalate (PET), polypheneylene oxide (PPO), and polyphenylene ether (PPE). Specific blends include PC/ABS, PC/PBT, PP/EPDM, PP/EPR, PP/PE, PA/PPO, and PPO/PE. The polymer compositions can be optimized to attain the desired overall properties, such as jetness, conductivity, toughness, stiffness, smoothness, and tensile properties. The foregoing list is not meant to be exhaustive but only illustrative of the various materials that can be used. Blends of polymers containing one or more of these polymeric materials, where the described polymers are present either as the major component or the minor component, may also be used. The specific type of polymer can depend on the desired application. Specific examples of polymers are described in more detail below.

Generally, the polymeric groups described in Volume 18 of the Encyclopedia of Chemical Technology, KIRK-OTHMER, (1982), page 328 to page 887, and Modern Plastics Encyclopedia '98, pages B-3 to B-210, and "Polymers: Structure and Properties," by C. A. Daniels, Technomic Publishing Co., Lancaster, Pa. (1989), all incorporated in their entirety herein by reference, can be used as the polymer(s). The polymers can be prepared in a number of ways and such ways are known to those skilled in the art. The above referenced KIRK-OTHMER section, Modern Plastics Encyclopedia, and C. A. Daniels' reference provide methods in which these polymers can be prepared.

The polymer compositions of the present disclosure may also include suitable additives for their known purposes and amounts. For example, the compositions may also include such additives as crosslinking agents, vulcanizing agents, stabilizers, pigments, dyes, colorants, metal deactivators, oil extenders, lubricants, and/or inorganic fillers, and the like, along with other additives discussed elsewhere herein. In some embodiments, the composites may also include additional particulates designed to increase thermal conductivity. In many embodiments, carbon black is the only particulate matter included, and the polymer composite may be void of any other particulate matter. In some embodiments, the carbon black can comprise greater than 50 wt %, greater than 75 wt % or greater than 95 wt % of the particulate material in the polymer composite.

The polymer compositions can be prepared using conventional techniques such as mixing the various components together using commercially available mixers. The composition may be prepared by batch or continuous mixing processes such as those well known in the art. For example, equipment such as discontinuous internal mixers, continuous internal mixers, reciprocating single screw extruder, twin and single screw extruder, etc. may be used to mix the ingredients of the formulations. Carbon black may be added to one or more of the components of a multipart polymer system and may be incorporated in the same or in different concentrations in each of the components. For example, in a two part epoxy system, carbon black can be mixed into the epoxy resin, into the crosslinking agent, or into both. For copolymers and terpolymers, the partially crystallized carbon black can be incorporated into one, some, or all of the prepolymer components. The concentration of partially crystallized carbon black in each component can, in some instances, be varied to help match the viscosities of the different components or otherwise improve the mixing of the components. Partially crystallized carbon black may also be used in a polymer blend. As used herein, a polymer blend is a homogeneous mixture of two or more distinct polymers, and is different from a copolymer or terpolymer. Partially crystallized carbon blacks can be introduced directly into a polymer blend prior to curing or may be introduced into one or more of the polymer precursors prior to blending with a second polymer precursor. Partially crystallized carbon blacks may also be incorporated into a masterbatch that is used as a carrier for subsequent mixing into a similar or different polymer system prior to curing. In a masterbatch, the concentration of the partially crystallized carbon black may be considerably greater (e.g., at least 2×, at least 3×, at least 4×, or between 2× and 10×, for example, from 3× to 8× or from 2× to 6×) than in the resulting composite polymer composition. The composite polymer compositions including partially crystallized carbon black may be mixed and formed into pellets for future use in manufacturing such materials as articles for automotive applications.

Partially crystallized carbon blacks can be formed by increasing the crystallinity of a base (untreated) carbon black (e.g., made by a furnace, thermal, lamp, plasma or acetylene decomposition process) without fully crystallizing the particles. Base furnace blacks exhibit a native crystallinity having a typical Raman microcrystalline planar size ($L_a$) in the range of 16 to 21 Å. In one set of embodiments, base carbon blacks are partially crystallized by controlled heat treatment of a base carbon black. A carbon black is "heat treated or processed" or "thermally treated or processed" if it is exposed to a secondary (after initial particle production) thermal process that alters the crystallinity, surface energy and the morphology of the carbon black particle. Crystallization of the carbon black particles can also alter the shape of the primary particle, for example, changing it from substantially spherical to a more (but not necessarily perfect) polyhedral shape.

Partially crystallized carbon blacks can be formed from base carbon blacks that are readily available. Suitable base carbon blacks that can be employed include: VULCAN® XC72, VULCAN® XC72R, and VULCAN® XC500 carbon blacks and other carbon blacks sold under the Regal®, Black Pearls®, Spheron®, CSX™, Vulcan® and Sterling® names, all available from Cabot Corporation. Other carbon blacks such as KETJEN® EC 300 and KETJEN®EC 600 carbon blacks, supplied by AkzoNobel; PRINTEX® XE carbon black, supplied by Evonik; Ensaco® 350 carbon black, supplied by TIMCAL; Raven®, XT Technology, Ultra®, and other carbon blacks available from Birla Carbon; the Corax®, Durex®, Ecorax®, Sable™ and Purex® trademarks and the CK line available from Orion Engineered Carbons; S.A., and Chezacarb® B carbon black supplied by Unipetrol RPA (Unipetrol Group) also can be utilized as base carbon blacks.

One measure of crystallinity is the Raman microcrystalline planar size. Raman measurements of $L_a$ (microcrystalline planar size) are based on Gruber et al., "Raman Studies of Heat-Treated Carbon Blacks," Carbon Vol. 32 (7), pp. 1377 1382, 1994, which is incorporated herein by reference. The Raman spectrum of carbon includes two major "resonance" bands at about 1340 cm$^{-1}$ and 1580 cm$^{-1}$, denoted as the "D" and "G" bands, respectively. It is generally considered that the D band is attributed to disordered sp$^2$ carbon and the G band to graphitic or "ordered" sp$^2$ carbon. Using an empirical approach, the ratio of the G/D bands and the $L_a$ measured by X-ray diffraction (XRD) are highly correlated, and regression analysis gives the empirical relationship:

$$L_a = 43.5 \times (\text{area of } G \text{ band/area of } D \text{ band})$$

in which $L_a$ is calculated in Angstroms. Thus, a higher $L_a$ value corresponds to a more ordered crystalline structure. Crystallinity can also be measured by X-ray diffraction (XRD).

In one method of production, a heat treated carbon black can be prepared in a tube furnace or other suitable heater. The furnace can be heated electrically or by fossil fuel combustion. The temperature of the carbon black bed can be consistent throughout to assure that all of the carbon black is exposed to the same reaction conditions. The carbon black bed may be static or may be a fluidized bed. The samples can be exposed to specific temperatures, for example as provided below, for an amount of time sufficient to reach, but not exceed, the desired partial crystallinity. The samples can be thermally treated in an inert environment and an inert gas such as nitrogen may be passed through or over the carbon black to aid in removal of any volatiles that are lost from the carbon black. By sampling at various time intervals, an operator can analyze the samples and accurately determine the carbon black's level of crystallinity. Those of skill in the art are able to sample the carbon black after such a treatment, analyze the Raman microcrystallinity, and adjust the process accordingly to achieve a target level of, for example, crystallinity or surface energy. Once time and temperature profiles are determined for a specific base carbon black, the profile can be repeated on that specific base carbon black to reproduce partially crystallized carbon blacks having, for instance, desired crystallinity, surface energy, surface area and OAN structure. Other methods of heat treatment are known to those of skill in the art and may be calibrated in the same manner.

In various embodiments, carbon black particles may be exposed to temperatures of greater than or equal to 600° C., greater than or equal to 700° C., greater than or equal to 800° C., greater than or equal to 1000° C., greater than or equal to 1100° C., greater than or equal to 1200° C., greater than or equal to 1300° C., greater than or equal to 1400° C., greater than or equal to 1500° C. or greater than or equal to 1600° C. In other embodiments, carbon black particles may be exposed to temperatures of less than 600° C., less than 800° C., less than 1000° C., less than 1100° C., less than 1200° C., less than 1300° C., less than 1400° C., less than 1500° C., less than 1600° C., less than 1700° C. or less than 1800° C. Specific temperature ranges for treatment include 1000° C. to 1800° C., 1100° C. to 1700° C., 1100° C. to 1600° C., 1100° C. to 1500° C., 1100° C. to 1400° C. and 1100° C. to 1300° C. The treatment can occur in an inert atmosphere such as nitrogen. The dwell time of the material at the selected temperature may be as short as milliseconds or greater than or equal to 30 minutes, one hour, two hours or more than two hours. In some embodiments, the dwell time may be limited to less than ten hours, less than three hours, less than two hours, less than 90 minutes, less than one hour or less than 30 minutes. The temperature may be kept constant or in alternative embodiments may be ramped up or down during the dwell time.

In some embodiments, the partially crystallized carbon black may have a Raman microcrystalline planar size ($L_a$) of at least 20 Å, at least 23 Å, at least 24 Å, at least 25 Å, at least 26 Å, at least 27 Å, at least 28 Å, at least 29 Å, at least 30 Å, at least 35 Å or at least 40 Å. In some cases, the partially crystallized carbon black has a Raman microcrystalline planar size ($L_a$) of 100 Å or less, 75 Å or less, 50 Å or less, 40 Å or less, 35 Å or less or 30 Å or less. Crystallinity, measured by Raman spectroscopy, may also be reported using the percent crystallinity of the particle and in some cases, the percent crystallinity may be greater than 25, greater than 30, greater than 35, greater than 37, greater than 40, greater than 42 or greater than 50. The same, or different examples, may exhibit a percent crystallinity of less than 65, less than 60, less than 55, less than 50, less than 45, less than 42, less than 40, less than 38, less than 35, less than 32 or less than 27.

Partial crystallization can include increasing the native Raman microcrystalline planar size of the base carbon black by greater than or equal to 2, 4, 6, 8, 10, 12, 14, 16, 18, 20, 22 or 24 Å, and/or increasing the native Raman microcrystalline planar size by less than or equal to 35, 30, 25, 20, 15 or 10 Å. Similarly, the native Raman microcrystalline planar size of the base carbon black can be increased by greater than or equal to 10%, 20%, 30%, 50%, 75%, 100%, 120% or 150%. In some embodiments the increase in the Raman microcrystalline planar size of the base carbon black can be limited to less than or equal to 10%, 20%, 30%, 50%, 75%, 100%, 120% or 150%. The amount of crystallization can be checked by pulling carbon black samples at various time intervals and measuring the Raman microcrystalline planar size.

The treatment of the base carbon black can increase the Raman microcrystalline planar size ($L_a$) by greater than 5, 10, 15, 20 or 25 Å and decrease the surface energy while limiting a decrease in the Brunauer-Emmett-Teller (BET) surface area to no more than 25%, e.g., by no more than 10%, or decreases by 1% to 25%, 5% to 25%, 10% to 25%, 1% to 10%, or 5% to 10%, relative to the BET surface area of the base carbon black. Similarly, OAN structure can be preserved so that the partially crystallized carbon black has an OAN structure that is reduced by less than 5%, 10% or 25% when compared to the base carbon black.

The surface energy (SE) of a carbon black particle can be determined by measuring the water vapor adsorption using a gravimetric instrument. The carbon black sample is loaded onto a microbalance in a humidity chamber and allowed to equilibrate at a series of step changes in relative humidity. The change in mass is recorded. The equilibrium mass increase as a function of relative humidity is used to generate the vapor adsorption isotherm. Spreading pressure (in mJ/m$^2$) for a sample is calculated as $\pi_e$/BET, in which:

$$\pi_e = RT \int_0^{p0} \Gamma d\ln p$$

and R is the ideal gas constant, T is temperature, $\Gamma$ is moles of water adsorbed, p0 is the vapor pressure, and p is the partial pressure of the vapor at each incremental step. The spreading pressure is related to the surface energy of the solid and is indicative of the hydrophobic/hydrophilic properties of the solid, with a lower surface energy (SE) corresponding to a higher hydrophobicity.

In some embodiments, the partially crystallized carbon black has a surface energy (SE) of 10 mJ/m$^2$ or less, 9 mJ/m$^2$ or less, 8 mJ/m$^2$ or less, 7 mJ/m$^2$ or less, 6 mJ/m$^2$ or less, 5 mJ/m$^2$ or less, or 3 mJ/m$^2$ or less. In the same and other embodiments, the partially crystallized carbon black has a surface energy (SE) of greater than 0 mJ/m$^2$, greater than 1 mJ/m$^2$, greater than 2 mJ/m$^2$, greater than 3 mJ/m$^2$, greater than 4 mJ/m$^2$, greater than 5 mJ/m$^2$, greater than 6 mJ/m$^2$, greater than 7 mJ/m$^2$, greater than 8 mJ/m$^2$ or greater than 9 mJ/m$^2$.

One way of measuring the surface area of carbon blacks is the Brunauer-Emmett-Teller method (BET by ASTM 6556). Different embodiments of the partially crystallized carbon blacks used herein may have a BET surface area of at least 100 m$^2$/g, e.g., ranging from 100 m$^2$/g to 600 m$^2$/g. In other cases, the partially crystallized carbon black has a BET of at least 200 m$^2$/g, at least 300 m$^2$/g, at least 400 m$^2$/g, at least 500 m$^2$/g or at least 600 m$^2$/g. In some embodiments, the BET of the partially crystallized carbon black is less than 1200 m$^2$/g, less than 1000 m$^2$/g, less than 800 m$^2$/g, less than 700 m$^2$/g, less than 600 m$^2$/g or less than 500 m$^2$/g. In one particular set of embodiments, the BET surface area may be in the range of 40 to 400 m$^2$/g, 46 to 350 m$^2$/g, 40 to 300 m$^2$/g, or 40 to 200 m$^2$/g. In another embodiment, the BET surface area is less than 425+/−25 m$^2$/g.

Another way of characterizing the surface areas of carbon blacks is to use the statistical thickness surface area (STSA) according to ASTM D6556). The STSA of many of the carbon blacks described herein can be at least 100 m$^2$/g, e.g., ranging from 100 m$^2$/g to 600 m$^2$/g. In other cases, the partially crystallized carbon black has an STSA of at least 200 m$^2$/g, at least 300 m$^2$/g, at least 400 m$^2$/g, at least 500 m$^2$/g or at least 600 m$^2$/g. In some embodiments, the STSA of the partially crystallized carbon black is less than 1200 m$^2$/g, less than 1000 m$^2$/g, less than 800 m$^2$/g, less than 700 m$^2$/g, less than 600 m$^2$/g or less than 500 m$^2$/g.

While thermal treatment is one method to provide for partial crystallization, specific temperatures, dwell times and furnace geometries may need to be adjusted to arrive at desired levels of crystallinity, structure, surface area and surface energy. For example, it has been found that a partially crystallized carbon black prepared by heating a base carbon black at a temperature ranging from 1100° C. to 1800° C. for a limited time (e.g., less than 10 hours, less than 2 hours or less than 1 hour) can yield a thermally-treated carbon black having BET surface area (ASTM 6556) ranging from 100 m$^2$/g to 1100 m$^2$/g and one or more other specific properties, such as a surface energy (SE) of 10 mJ/m$^2$ or less (e.g., 9 mJ/m$^2$ or less, 6 mJ/m$^2$ or less, or 3 mJ/m$^2$ or less), a Raman microcrystalline planar size ($L_a$) of at least 22 Å and less than 60 Å (e.g., ranging from 22 Å to 60 Å, at least 25 Å, or ranging from 25 Å to 50 Å etc.) or a combination thereof.

In many embodiments, the structure of the partially crystallized carbon blacks may be controlled within a specific range. Structure can be measured using the oil absorption number (OAN) which is known to those of skill in the art and is described in ASTM D2414. For example, the OAN may be greater than greater than 120 cm$^3$/100 g, greater than 140 cm$^3$/100 g, or greater than 160 cm$^3$/100 g. In other embodiments, the OAN may be less than 200, less than 180 or less than 160 cm$^3$/100 g. In a set of embodiments, the OAN may be greater than 120 cm$^3$/100 g and less than 200 cm$^3$/100 g. Experimental data show that if the OAN of the base carbon black is too low, then partial crystallization does not provide improvements to thermal conductivity.

In one thermal treatment embodiment, the base carbon black prior to partial crystallization (base carbon black) has a surface energy of greater than 10 mJ/m$^2$ and a BET surface area (ASTM 6556) of at least 50 m$^2$/g. For example, the BET surface area can be at least 100 m$^2$/g, 200 m$^2$/g, 300 m$^2$/g, at least 500 m$^2$/g, at least 1000 m$^2$/g, 1200 m$^2$/g, at least 1300 m$^2$/g, at least 1400 m$^2$/g, or at least 1500 m$^2$/g. In the same or different embodiments, the BET surface area can be less than or equal to 150 m$^2$/g, 300 m$^2$/g, 500 m$^2$/g, 1000 m$^2$/g, 1500 m$^2$/g or 2100 m$^2$/g. The base carbon black can, in some cases, have a surface energy of greater than 10 mJ/m$^2$ and a BET surface area ranging from 200 m$^2$/g to 1500 m$^2$/g, e.g., a BET surface area ranging from 300 m$^2$/g to 1500 m$^2$/g, from 500 m$^2$/g to 1500 m$^2$/g, from 1000 m$^2$/g to 1500 m$^2$/g, from 300 m$^2$/g to 1000 m$^2$/g, from 500 m$^2$/g to 1000 m$^2$/g, from 300 m$^2$/g to 500 m$^2$/g, or from 200 m$^2$/g to 500 m$^2$/g. These same ranges of BET surface areas can be maintained in partially crystallized carbon blacks made from these base carbon blacks although the surface energy will typically be lower than in the base carbon black. The base carbon black can be a furnace black.

In a specific set of examples, the partially crystallized carbon black has a BET surface area of 125-175 m$^2$/g, e.g. within the range of from about 138 to 169 m$^2$/g, for example 130, 135, 138, 142, 147, 150, 155, 160, 165 or 169 m$^2$/g; an external surface area (STSA) within the range of from 135 to 142 m$^2$/g, for example, 136, 137, 138, 139, 140 or 141 m$^2$/g; a total pore volume of 0.44 to 0.49 ml/g, for example, 0.45. 0.46, 0.47 or 0.48 ml/g; Raman crystallinity ($L_a$) of from 28.4 to 34.6 Å, for example, 29.0, 29.5, 30.0, 30.5, 31.0, 31.5, 32.0, 32.5, 33.0, 33.5 or 34.0 Å; and a surface energy (SE) of 4.9 to 6.3 mJ/m$^2$, for example, 5.2, 5.5, 5.8 or 6.1 mJ/m$^2$.

The iodine number according to ASTM D1510 of the partially crystallized carbon blacks may be, for example, less than 450, less than 425, less than 400, less than 350, less than 300, less than 250 or less than 200 mg/g. In the same or other embodiments, the iodine number may be greater than 50, greater than 100, greater than 150, greater than 200, greater than 250 or greater than 300 mg/g.

The partially crystallized carbon blacks described herein are typically unmodified, meaning they are void of any organic treatment. As used herein, a carbon black that is unmodified is a carbon black that has not had organic groups chemically attached to it.

Carbon black can be provided in any amount suitable for the polymer system being utilized, the specific end use, mixing technique, viscosities encountered, desired properties of the finished product, and other considerations. Partially crystallized carbon black can be present in the system in a total concentration within the general range of from about 12% to about 28% by weight, preferably 15-25% by weight, for example 12% to 20%, 15% to 23%, or 17% to 28%. Other loading levels can be used, as determined by routine experiments. Too high a loading level will cause the resulting polymer composition to be too viscous to form into articles; too low a loading level will not provide sufficient thermal conductivity. It is understood that the total amount of carbon black can be added to one component only or can be divided between or among some or all components that make up the polymer system being employed. Mixtures of two, three or more different carbon blacks can also be used.

The partially crystallized carbon blacks described herein can provide improved thermal conductivity as well as improved rheology when compared to the corresponding base carbon black in the same polymer system. For example, the use of partially crystallized carbon blacks in polymer precursors can allow for high loadings without an increase in viscosity or, alternatively, can allow for similar loadings and a lower viscosity. When used in polymer systems at concentrations of, for example, 12 to 28 percent by weight, the partially crystallized carbon blacks, when compared to the corresponding base carbon black exhibiting Raman microcrystallinity ($L_a$) of less than 21 Å, can improve thermal conductivity by more than 5, 10, 15 or 20 percent in comparison to the corresponding base black. At the same concentrations, the thermal conductivity may be improved by more than 1.6× with respect to the virgin polymer, for example, from 1.7× to 3× or from 2× to 4× with respect to the virgin polymer. At the same concentrations, the melt flow index (MFI) of the polymer precursor can be improved by more than 50%, 100% or 150%. These improvements in thermal conductivity and viscosity can be exploited individually or in tandem. For example, a one to one substitution of partially crystallized carbon black for a base carbon black can provide a polymer composition that exhibits both improved viscosity and improved thermal conductivity. Alternatively, the substitution of partially crystallized carbon black for a base carbon black means the amount of carbon black added to the polymer composition can be increased without any loss in flow properties but with a substantial gain in thermal conductivity due to both a more efficient transfer of heat per gram of carbon black and the higher loading of carbon black in the composition. In another aspect, the use of a partially crystallized carbon black in a polymer composition allows for the use of a reduced amount of carbon black without any loss of thermal conductivity in the polymer composition.

In some embodiments, the polymer system consists of, or essentially of, a polymer and partially crystallized carbon black. In other embodiments, the polymeric component of the composite polymer composite accounts for greater than 50%, greater than 75% or greater than 85% of the polymeric system by weight. In another embodiment, the polymer system consists of, or essentially of, a polymer, a partially crystallized carbon black, and boron nitride (BN).

Ingredients other than carbon black and the polymeric component can be present in the polymer described herein and/or utilized in its preparation. The nature, amounts and/or proportions of these ingredients (also referred to as "additives") typically depend on the polymer system utilized, end use, processing conditions, properties, e.g., viscosity of the precursor formulation, and other considerations. In many cases, additives are provided as part of the polymer system utilized and/or can be added at a suitable point during the formulation process, prior to or during curing or at another suitable time. Amounts often are preset by the polymer system selected. This is particularly true with off the shelf systems. In other cases, suitable additive amounts can be determined based on experience and/or by routine experimentation. Examples of additional ingredients include but are not limited to curing agents, rheology modifiers, waxes, reactive diluents, extenders, pigments, fillers, catalysts, UV and thermal stabilizers, adhesion promoters, such as silanes, surfactants, tackifying agents, solvents and others, including other additives discussed elsewhere herein.

In some embodiments, the composition can include a second species of particle to promote heat transfer. For instance, in addition to a partially crystallized carbon black, the composition may include a high thermal conductivity (HTC) particle. HTC particles include non-electrically conductive materials such as ceramics like aluminum nitride (AlN), beryllium oxide, silicon carbide and boron nitride (BN). Electrically conductive HTC particles include metals from the periodic table such as molybdenum, aluminum, copper, tungsten, silver and gold. Other HTC particles may comprise minerals such as diamond, corundum, hematite, spinel and pyrite. The specific shape of an HTC particle can improve heat transfer, and particles may be in the form of spheres, cylinders (rods), cubes, blades or platelets. HTC particles can also be irregularly shaped. In certain embodiments, these HTC particles include non-carbonaceous particles that exhibit a thermal conductivity of greater than 30 W/mK. Specific examples of HTC particles that may be used in conjunction with partially crystallized carbon blacks include BN, MgO, ZnO, and $Al_3O_2$. In some cases, the combination of an HTC particle such as BN and a partially crystallized carbon black has been shown to provide more efficient heat transfer than a total equivalent loading (by mass or volume) of BN only. For example, the combination of an HTC particle such as BN and a partially crystallized carbon black can increase the thermal conductivity of a polymer composition by 1.5×, 2×, 3×, 4× or more, for example, from 1.5× to 6× or from 2× to 4×, compared to the same polymer composition absent the BN and partially crystallized carbon black.

To form the composite polymers and polymer precursors described herein, components are combined using a suitable mixing technique and in a suitable sequence, including simultaneous mixing of some or all of the starting materials.

As used herein, a polymeric precursor is a monomer or oligomer that is not yet polymerized but is capable of being made into a polymer through cross-linking or other polymerizing process. The polymeric precursors used herein to form carbon black composites are fluid enough that carbon black can be evenly dispersed throughout the precursor. In one example, a partially crystallized carbon black is combined with a polymeric precursor such as a polymeric precursor of a thermoset. Under suitable conditions (e.g., specific temperatures, pressures, curing time, presence of curing agents, and/or other parameters), the polymeric precursor is cured (polymerized), as known in the art. The precursor can be the entire polymer system utilized to form the conductive materials described herein or a component thereof. The partially crystallized carbon black, in various embodiments, can be dispersed in aggregate or agglomerate form.

In multi-component systems (i.e., systems made of two or more components), the total amount of carbon black can be divided between or among some or all of the components. Ratios of the amounts in each component can depend, for example, on the relative volumes of the components. In some multi-part systems, attempts are often made to match the viscosities of the components, in order to facilitate processing, e.g., mixing. In such cases, carbon black can be added to two or more precursor components in amounts selected to yield similar viscosities. Such amounts can be established based on the formulator's experience or determined by routine experimentation.

Ratios of carbon black in each polymer precursor component also can depend on factors such as the nature of the curative used, desired curing time, properties of the final product and so forth, as known in the art. The weight ratios of carbon black to polymer precursor can be, for example, from 1:1 to 1:10, for example, from 1:2 to 1:8 or from 1:4 to 1:6. Other suitable ratios can be selected. In an exemplary two-part formulation, carbon black is added to both components, with smaller (less than 50% by weight, e.g., less than 40%, less than 30%; or 25% or less, for instance within the range of from about 45% to about 15%; 40 to about 20% or 35 to about 25% by weight) amounts typically added to the cross-linking agent.

Various mixing techniques are known for mixing solid ingredients with a polymer precursor. For example, dry powder mixing can be employed with polymer precursors that are in solid form. Depending on end use, the resulting mixture can be combined with a liquid to form a slurry or paste.

With a precursor that presents a sufficiently low viscosity, however, mixing can be conveniently obtained by dispersing carbon black and, optionally, other additives in the precursor. In many cases, carbon black and, optionally, other additives, are dispersed using suitable mixing equipment, such as, for instance, three-roll mills, sigma blade mixers, high shear mixers, or others, as known in the art. The mixing operation can be performed manually or by robotics.

Co-solvents and/or dispersants can be added to facilitate the process. In a specific embodiment, the dispersion is formed in the absence of further co-solvents and/or dispersants, i.e., without adding co-solvents and/or dispersants that are not part of the initial formulation recipe. In other cases, using a carbon black such as described herein lowers the amounts of solvents and/or dispersants required in an original recipe (for instance, a recipe, for a formulation that uses untreated carbon black).

The distribution of carbon black achieved in a mixture can be assessed by visual inspection or by a suitable qualitative or quantitative analytical technique. Uniform or substantially uniform distribution is thought to promote electrical conductivity, thermal conductivity, mechanical strength, and/or other properties of the end product.

In many cases a composition that includes carbon black and a polymer precursor is viscoelastic, i.e., exhibits both viscous and elastic characteristics when undergoing deformation. Whereas under applied stress viscous materials resist shear flow and strain linearly with time, elastic materials strain when stretched and quickly return to their original state once the stress is removed. Viscoelastic materials have elements of both properties and show time-dependent strain.

Viscoelasticity is typically studied using dynamic mechanical analysis, applying a small oscillatory stress and measuring the resulting strain. While with purely elastic materials stress and strain are in phase, so that the response of one caused by the other is immediate, strain lags stress by a 90 degree phase lag in purely viscous materials. Viscoelastic materials are thought to exhibit an in-between behavior, showing some lag in strain.

The complex dynamic modulus, G, is generally used to represent the relationship between the oscillating stress and strain:

$$G = G' + iG''$$

where: the real part of the complex dynamic modulus, G', is the storage modulus; G'' of the imaginary part is the loss modulus; and $i^2 = -1$.

If $\sigma_0$ and $\varepsilon_0$ are the amplitudes of stress and strain, respectively, and $\delta$ is the phase shift between them, $G' = (\sigma_0/\varepsilon_0)\cos\delta$ and $G'' = (\sigma_0/\varepsilon_0)\sin\delta$.

Techniques related to conducting a Dynamic Mechanical Analysis (DMA) to determine elastic modulus (or storage modulus, G'), viscous modulus (or loss modulus, G'') and damping coefficient (tan $\delta$) as a function of temperature, frequency or time are described, for example, in ASTM D4065, D4440 and D5279.

In many cases, combining carbon black or other solid ingredients with a viscoelastic composition tends to increase its storage modulus. Excessive increases, however, can render mixing and/or handling of the composition, including its application, difficult or impossible. In practice, this limits the amounts of carbon black that can be added and thus curtails the thermal conductivity and/or other effects sought by adding carbon black in the first place. It was discovered, however, that a carbon black such as the partially crystallized carbon blacks described herein can mitigate increases in the storage modulus. For example, a partially crystallized carbon black added to a component of a two part epoxy system can lower the storage modulus of the composition by about one order of magnitude relative to a comparative formulation that is identical (same ingredients and amounts) to the composition except with respect to the carbon black which is a base carbon black. The lower viscosity achievable using partially crystallized carbon blacks enhances the rheological flexibility of the formulation.

Without wishing to be bound to any particular interpretation, it is believed that particle-polymer compatibility and particle-particle cohesive strength may both play a role in the dispersion of carbon black in a polymer precursor. While the underlying architecture and morphology of a base carbon black particle as compared to its partially crystallized form is essentially unchanged, it is thought that the untreated and partially crystallized carbon blacks perform differently when dispersed. Thus it is possible that the surface of the partially crystallized carbon particle is more compatible with the polymer (relative to the untreated carbon black), facilitating dispersion. A reduction in the particle-particle cohesive strength could also lead to an enhancement in dispersion. As a result, a polymer composition containing partially crystallized carbon black can be formulated to a much lower viscosity than one containing untreated carbon black. The formulator can then have the flexibility to increase the loading of carbon black and/or that of other additives. In another approach, the mixing, handling and/or application of the lower viscosity composition (at an unchanged loading) can facilitate its use.

The viscoelastic composition can be applied for a desired end use, for example to a substrate, employing techniques known in the art. Application of the viscoelastic composition can be manual or automated and can be performed by extrusion, painting, spraying, brushing, dipping, or by another suitable method. In other cases, the composition is molded or extruded.

To produce a thermally conductive polymer, the composition containing carbon black is cured under suitable conditions (temperature, ramping and soaking protocols, time period, pressure, radiation, specific curing aids, special atmospheres if necessary, etc.) as known in the art or as determined by experience with similar formulations and/or routine experimentation. With commercial systems, for example, curing typically is conducted according to instructions provided by the manufacturer. As known in the art, curing conditions are highly dependent on the specific polymer system employed, heat curing being a common requirement.

Curing the polymer(s) in the polymer system produces a thermally conductive material that can be thought of as a polymer-carbon black composite. In many embodiments, the material displays good thermal conductivity as well as good mechanical and rheological properties.

EXAMPLES

Example 1—Viscosity

To evaluate the rheological effects of using partially crystallized carbon blacks in a polymer precursor, several polymer precursor samples were prepared using both base and partially crystallized carbon blacks. These included high density polyethylene (HDPE), polystyrene (PS), polycarbonate (PC) and polyamide-6 (PA). Each of the carbon blacks is identified in Table 1. The carbon blacks were heat treated under an inert atmosphere at the temperature given in the table until they achieved the Raman La specified in Table 2. The analyzed properties for each of the carbon blacks are reported in Table 2. The indicator "NA" means that the value was not measured and "ND" means that the value was below the limit of detection. Iodine number was determined according to ASTM D1510; BET surface area was determined according to ASTM D6556; OAN structure was determined according to ASTM 2414; and surface energy (SE), Raman crystallinity ($L_a$) and percent crystallinity were determined according to the methods described above. Melt Flow Index of the polymer composites was measured at the reported loads and temperatures according to ISO1133.

The HDPE resin was Lupolen™ 4261A IM resin from LyondellBasell and exhibits an MFI of 15 g/10 min at a load of 2.16 kg and a temperature of 190° C. Melt flow index (MFI) for the composite HDPE samples was measured at 21.6 kg and 190° C. for 10 min. A 1.664 L internal batch Banbury mixer was used to mix in the carbon black under the following conditions:

| Chamber cooling temperature: | 40° C. |
|---|---|
| Rotor cooling temperature: | 40° C. |
| Mixing time post flux: | 90 s |
| Ram pressure: | 4.2 bars |
| Rotor speed: | 180 RPM |

The polystyrene (PS) resin was Edistir™ N1840 resin from Polimeri. It has an MFI of 10 g/10 min at a load of 5 kg at 200° C. Melt flow index (MFI) for the composite PS samples was measured at 10 kg and 200° C. for 10 min. A 1.664 L internal batch Banbury mixer was used to mix in the carbon black under the following conditions:

| Chamber cooling temperature: | 20° C. |
|---|---|
| Rotor cooling temperature: | 20° C. |
| Mixing time post flux: | 90 s |
| Ram pressure: | 4.2 bars |
| Rotor speed: | 180 RPM |

The polycarbonate (PC) resin was Wonderlite™ PC-122 resin from Chimei Asahi. It has an MFI of 22 g/10 min at a load of 1.2 kg at 300° C. Melt flow index for the composite PC samples was measured at 10 kg and 260° C. for 10 min. The polycarbonate polymers were prepared on an APV twin screw extruder with a moderate shear screw profile under the following conditions:

| Screw Speed: | 300 RPM |
|---|---|
| Output: | 12 kg/h |
| Temperature from hopper to die (° C.): | 175-230-230-260-260-260-260-240 |

The polyamide-6 (PA) was Zytel™ ST7301NC resin from Dupont. Melt flow index (MFI) for the composite PA samples was measured at 10 kg and 275° C. for 10 min. The PA polymers were prepared on an APV twin screw extruder with a moderate shear screw profile under the following conditions:

| Screw Speed: | 300 RPM |
|---|---|
| Output: | 12 kg/h |
| Temperature from hopper to die (° C.): | 175-230-230-260-260-260-260-240 |

Melt flow index results for each of the polymer composites are provided in Table 3 and indicate that at the same loading, the composite samples including partially crystallized carbon black provided significantly higher MFI than did the parent, or base carbon black, from which they were formed. It is notable that these improvements are obtained without significantly altering the surface area or structure of the carbon blacks.

TABLE 1

Carbon Black Sample Identification

| Sample ID | Base Carbon Black | Treatment |
|---|---|---|
| CB1 | VULCAN XC500 | Untreated |
| CB2 | VULCAN XC500 | Thermally treated at 1200° C. |
| CB3 | VULCAN XC72 | Untreated |
| CB4 | VULCAN XC72 | Thermally treated at 1200° C. |
| CB5 | VULCAN XC200 | Untreated |
| CB6 | VULCAN XC200 | Thermally treated at 1400° C. |
| CB7 | VULCAN XC68 | Untreated |
| CB8 | VULCAN XC68 | Thermally treated at 1050° C. |
| CB9 | REGAL 85 | Untreated |
| CB10 | REGAL 85 | Thermally treated at 1200° C. |
| CB11 | CSX 99 | Untreated |
| CB12 | CSX 99 | Thermally treated at 1400° C. |
| CB13 | VULCAN XC500 | Thermally treated at 1800° C. |
| CB14 | VULCAN XC72 | Thermally treated at 1400° C. |
| CB15 | VULCAN XC72 | Thermally treated at 1500° C. |
| CB16 | CSX 691 | Untreated |

TABLE 2

Carbon Black Properties

| Sample | $I_2$ No. (mg/g) | BET ($m^2$/g) | OAN ($cm^3$/100 g) | SE (mJ/$m^2$) | $L_a$ (Å) | Crystallinity % |
|---|---|---|---|---|---|---|
| CB1 | 73.3 | 57 | 148.0 | 18.0 | 21 | 33 |
| CB2 | 71.1 | 55 | 139.5 | 1.0 | 38 | 47 |
| CB3 | 252.7 | 235 | 175.4 | 14.9 | 18 | 29 |
| CB4 | 177.8 | 153 | 164.5 | 6.3 | 39.5 | 47.6 |
| CB5 | 46 | 46 | 115 | 2.6 | 18 | 29 |

TABLE 2-continued

Carbon Black Properties

| Sample | I₂ No. (mg/g) | BET (m²/g) | OAN (cm³/100 g) | SE (mJ/m²) | $L_a$ (Å) | Crystal-linity % |
|---|---|---|---|---|---|---|
| CB6 | NA | 46 | 115 | NA | 29 | 40 |
| CB7 | 68 | 58 | 123 | 9.3 | 18.4 | 29.7 |
| CB8 | NA | NA | NA | <1 | 29.2 | 40.2 |
| CB9 | 16 | NA | 36 | 13.6 | 17 | 28 |
| CB10 | 16 | NA | 36 | NA | 32 | 42 |
| CB11 | NA | 425+/−25 | 150 | 16.2 | 20 | 31 |
| CB12 | NA | 425+/−25 | 150 | NA | 24 | 36 |
| CB13 | 74 | NA | 148 | ND | 95 | 68 |
| CB14 | NA | NA | NA | 1.3 | 39.5 | 47.6 |
| CB15 | NA | NA | NA | 0.9 | 41.6 | 48.9 |
| CB16 | 15 | 20 | 95.2 | 14 | 18 | 29 |

NA = Not Available

TABLE 3

Melt Flow Index

| | Loading Wt % | MFI HDPE | MFI PS | MFI PC | MFI PA |
|---|---|---|---|---|---|
| CB1 | 18 | 8.3 | | | |
| CB2 | 18 | 11.9 | | | |
| CB1 | 24 | 5.5 | 11.8 | | 15.9 |
| CB2 | 24 | 8.6 | 13.4 | | 21.6 |
| CB1 | 26 | | | | 11.6 |
| CB2 | 26 | | | | 19.3 |
| CB3 | 16 | 9.3 | 16.4 | | |
| CB4 | 16 | 10.4 | 17.5 | | |
| CB3 | 22 | 5.1 | 7.8 | 13.4 | 20.8 |
| CB4 | 22 | 7.2 | 9.2 | 31.3 | 23.4 |
| CB3 | 24 | | | 8.9 | |
| CB4 | 24 | | | 24.5 | |
| CB7 | 22 | 5.6 | | | |
| CB8 | 22 | 9.2 | | | |

Example 2—Thermal Conductivity Measurements

To evaluate the thermal conductivity (TC) of composite polymers containing partially crystallized carbon blacks, a series of HDPE composite samples was tested using a NETZSCH® LFA 467 light flash apparatus at 25° C. The samples included both base carbon blacks as well as partially crystallized carbon blacks and the composite polymers were produced as described above in Example 1. Test samples for thermal conductivity measurements were molded using electrically heated presses to make 2.54 cm discs. The mold was made with 316 stainless steel plates with four one inch holes and 316 stainless steel cover plates. One gram of each sample was weighed out and placed in each round hole. KEVLAR® para-aramid sheets were placed on the top and bottom of each mold. The presses were set at 365° F., and the mold was placed on the presses for a 5 minute warm up, and then closed and pressurized to 23 psi for five minutes. The pressure was released by opening the presses, the hot molds were removed and placed on water cooled presses for ten minutes.

The sample size for measurement was a circular disc, 25 mm in diameter, ~1 mm thickness. Specimen thickness was measured by taking the average of three thickness values using a caliper measurement tool. Samples were coated with a thin layer of graphite spray lubricant and allowed to dry prior to measurement. The samples were loaded into the sample holder and equilibrated at 25° C. for 4 minutes. After equilibration time, each sample was pulsed with high-intensity, short duration radiant energy originating from a xenon lamp. The energy of the pulse was absorbed on the front face of the specimen and an IR detector measured the temperature rise on the rear face of the specimen. The thermal diffusivity value was calculated from the measured sample thickness and the time required for the temperature to reach a maximum value. Specific heat of each sample was calculated by measuring a standard reference material with a pre-established specific heat table (Pyroceram9XX) and using the Proteus62 LFA Analysis software to calculate the experimental values. Thermal conductivity was calculated by using equation 1.0:

$$k = \rho * c\_p * \alpha$$

Where k is the thermal conductivity (W/mK), ρ is the density of the sample (g/m³), cp is the specific heat capacity of the sample (J/g/K), and α is the thermal diffusivity of the sample (m²/s).

Thermal conductivity results are provided in Table 4 and FIGS. 1-5. FIG. 1 is a bar graph showing the relative thermal conductivity provided by VULCAN XC500 type carbon black (CB1) and two of its partially crystallized derivatives, CB2 and CB13. The results for CB2 show significantly higher thermal conductivity than for the base carbon black. Results for sample CB13, which was thermally treated at a higher temperature than CB2, exhibits thermal conductivity identical to that of the base carbon black CB1. It is believed that this poor thermal conductivity is the result of impaired particle dispersion due to over crystallizing the carbon black as CB13 has a Raman $L_a$ of 95 Å and a percent crystallinity of 68.

Figure 2:
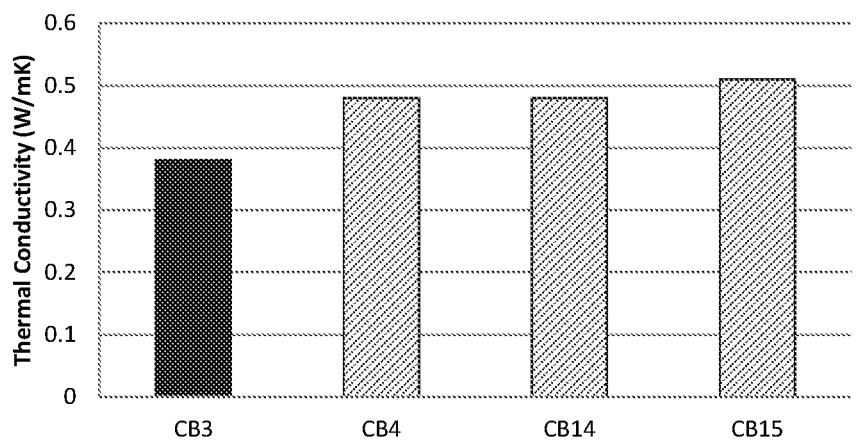
FIG. 2 is a bar graph comparing the thermal conductivity of a second base carbon black with three embodiments of a partially crystallized carbon black derivative.

FIG. 2 is a bar graph showing the relative thermal conductivity provided by VULCAN XC72 type carbon black (CB3) and three of its partially crystallized derivatives. Each of the partially crystallized derivatives, CB4, CB14 and CB15, show thermally conductivity significantly higher than that of the base carbon black, CB3. It is notable that these three partially crystallized carbon blacks have Raman $L_a$ measurements of 39.5, 39.5 and 41.6 Å, respectively.

Figure 3:
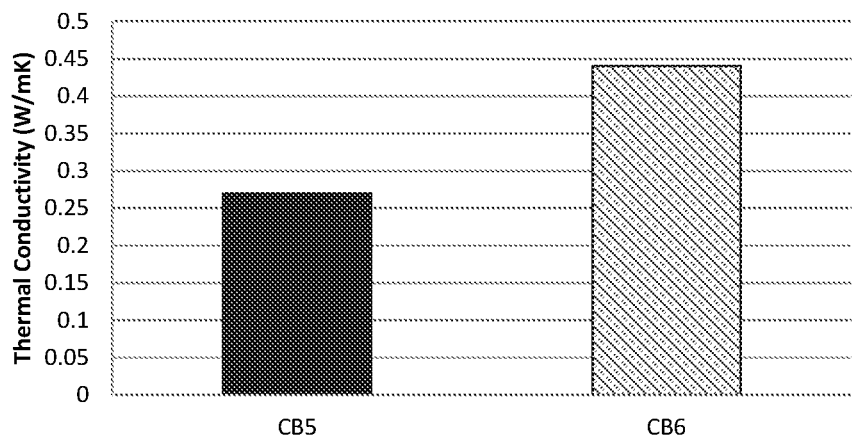
FIG. 3 is a bar graph comparing the thermal conductivity of a third base carbon black with an embodiment of a partially crystallized carbon black derivative.

FIG. 3 is a bar graph showing the relative thermal conductivity provided by VULCAN XC200 type carbon black (CB5) and its partially crystallized derivative, CB6. CB6 provides much improved thermal conductivity compared to its base carbon black (CB5) and has a Raman $L_a$ of 29 Å (an increase of 11 Å).

Figure 4:
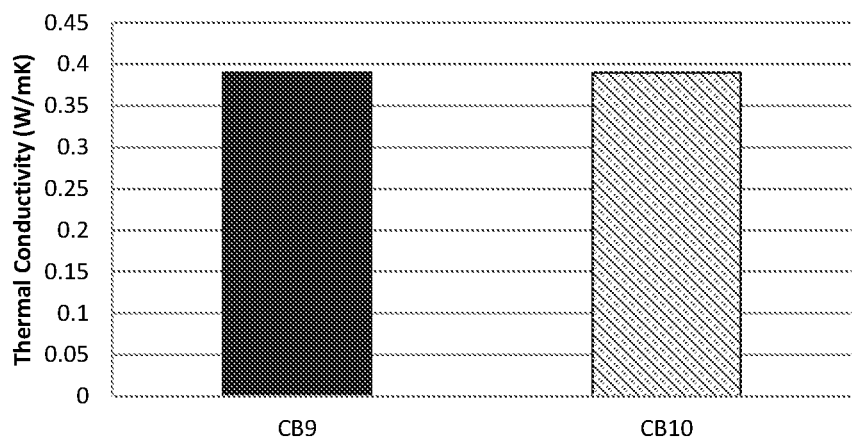
FIG. 4 is a bar graph comparing the thermal conductivity of a fourth base carbon black with an embodiment of a partially crystallized carbon black derivative.

FIG. 4 is a bar graph showing the relative thermal conductivity provided by REGAL 85 type carbon black (CB9) and its partially crystallized derivative, CB10. The partially crystallized derivative shows identical thermal conductivity to its base carbon black, CB9. Although partially crystallized, it is believed that thermal conductivity is not improved over the base carbon black because of the low structure (OAN of 36 cm³/100 g) of both the base carbon black (CB9) and the partially crystallized carbon black (CB10).

FIG. 5 is a bar graph showing the relative thermal conductivity provided by CSX 99 type carbon black (CB11) and its partially crystallized derivative, CB12. The thermal conductivity of the partially crystallized carbon black is slightly below that of the base carbon black (CB11) from which it is derived. Although CB12 was partially crystallized, it is believed that its poor thermal conductivity contribution was a result of its relatively low Raman $L_a$ of 24 Å.

In aggregate, these results show that the thermal conductivity of polymer composites can be significantly improved by substituting a partially crystallized carbon black for a base carbon black. These data also indicate that optimal thermal conductivity results are achieved when the Raman $L_a$ is greater than 24 Å and less than 95 Å, and when the OAN structure of the partially crystallized black is greater than 36 cm³/100 g.

As noted above, the partially crystallized carbon blacks are also capable of higher loadings than the base carbon blacks without adversely affecting the rheology of the polymer precursor. These higher loadings can be combined with the higher thermal conductivity to provide polymer composites having significantly higher thermal conductivity with no loss in rheological properties. Alternatively, lower carbon black loadings could be used (than the base carbon blacks) without a loss in polymer composite thermal conductivity.

TABLE 4

Thermal Conductivity of HDPE composites.

| Sample ID | Concentration in HDPE (wt %) | Thermal Conductivity (W/mK) |
|---|---|---|
| CB1 | 18.8 | 0.45 |
| CB2 | 18.6 | 0.51 |
| CB3 | 20.2 | 0.38 |
| CB4 | 16.7 | 0.48 |
| CB5 | 21 | 0.37 |
| CB6 | 21 | 0.44 |
| CB9 | 21.1 | 0.39 |
| CB10 | 21.1 | 0.39 |
| CB11 | 19.9 | 0.35 |
| CB12 | 19.8 | 0.34 |
| CB13 | 19.9 | 0.45 |
| CB14 | 14.6 | 0.48 |
| CB15 | 15.4 | 0.51 |

Example 3—Thermal Conductivity Measurements

In another set of experiments, thermal conductivity was measured in composite samples that were produced including two different types of filler. Results are provided below in Table 5. Filler concentrations are provided as volume percent. All samples were compounded with the same polyolefin resin, Lupolen 4261 A IM HDPE, available from Lyondell Basell Industries. This polyolefin has a melt flow index of 15 g/10 min (@190° C. and 21.6 Kg). Sample "BN1" is grade PCTP30D boron nitride high thermal conductivity (HTC) particles available from Saint-Gobain. These BN particles are platelets having a $D_{50}$ of 180 μm, have not been heat treated and have a thermal conductivity (W/mK) of from 30-130, a refractive index of 1.74 and a dielectric constant of from 3 to 4. Each composite was compounded as described below.

Molding Experimental Procedure

Each composite was compounded by mixing the particles and polymer resin with a 60 cc Brabender mixer (0.7 fill ratio) at a temperature of 170° C. for 15 minutes at 35 rpm. Each batch was then removed from the mixing chamber and allowed to cool to room temperature. Once the mixture reached room temperature it was introduced into a Retsch SM300 grinder that ran at 800 rpm to grind the polymer composite into a powder. The resulting polymer composite powder was collected and compression molded with a heated press at 365° F. for five minutes. To facilitate the mold release step, Kevlar sheets were placed between the stainless steel mold and the polymer composite. The resulting polymer composite molds were then placed on water cooled presses for ten minutes. The end result was a set of 25 mm (diameter)/1 mm (thickness) discs suitable for thermal conductivity measurements.

Thermal Conductivity Experimental Procedure

All the samples were measured for thermal conductivity on a NETZSCH LFA467 thermal conductivity meter at 25° C. The sample size for measurement was a circular disc, 25 mm in diameter, ~1 mm thickness. Specimen thickness was measured by taking the average of three thickness values from a caliper measurement tool. Samples were coated with a thin layer of graphite spray lubricant and allowed to dry prior to measurement. Samples were then loaded into the instrument's sample holder and equilibrated at 25° C. for 4 minutes. After equilibration time, each sample was pulsed with high-intensity, short duration radiant energy originating from a xenon lamp. The energy of the pulse was absorbed on the front face of each specimen and an IR detector measured the temperature rise on the rear face of the specimen. The thermal diffusivity value was calculated from the measured sample thickness and the time required for the temperature to reach a maximum value. The specific heat of each sample was calculated by measuring a standard reference material with a pre-established specific heat table (Pyroceram9) and using the Proteus62 LFA Analysis software to calculate the experimental values. Thermal conductivity was calculated by using the following equation:

$$k = \rho * c\_p * \alpha$$

Where k is the thermal conductivity (W/mK), ρ is the density of the sample (g/m³), cp is the specific heat capacity of the sample (J/gK), and α is the thermal diffusivity of the sample (m²/s). Results are provided in Table 5, below.

TABLE 5

| Grade | Volume % | Avg. TC [W/mK] | Avg. ST. DEV [W/mK] |
|---|---|---|---|
| CB1 | 10 | 0.363 | 0.006 |
| CB1 | 15 | 0.385 | 0.007 |
| CB1 | 20 | 0.412 | 0.011 |
| CB1 | 30 | 0.498 | 0.014 |
| CB1 + BN1 | 20 BN1 2.5 CB1 | 0.580 | 0.066 |
| CB1 + BN1 | 20 BN1 5 CB1 | 0.615 | 0.061 |
| CB1 + BN1 | 20 BN1 10 CB1 | 0.708 | 0.023 |
| CB16 + BN1 | 20 BN1 2.5 CB2 | 0.546 | 0.020 |
| CB16 + BN1 | 20 BN1 5 CB2 | 0.559 | 0.032 |
| CB16 + BN1 | 20 BN1 10 CB2 | 0.673 | 0.054 |
| BN1 | 10 | 0.469 | 0.025 |
| BN1 | 15 | 0.626 | 0.091 |
| BN1 | 20 | 1.123 | 0.186 |
| BN1 | 27 | 1.404 | 0.043 |
| CB2 + BN1 | 20 BN1 2.5 CB2 | 1.208 | 0.073 |
| CB2 + BN1 | 20 BN1 5 CB2 | 1.367 | 0.078 |
| CB2 + BN1 | 20 BN1 10 CB2 | 1.599 | 0.092 |
| CB2 | 10 | 0.452 | 0.072 |
| CB2 | 15 | 0.481 | 0.102 |
| CB2 | 20 | 0.536 | 0.038 |
| CB2 | 25 | 0.590 | 0.049 |
| HDPE | None | 0.289 | 0.020 |

FIG. 6 provides a graphical representation of the thermal conductivity of the composites including either only BN, only thermally treated carbon black, or only untreated carbon black. The results show the excellent thermal transfer properties of BN but also indicate that the partially crystallized carbon black (CB2) performs significantly better than its parent material CB1.

Figure 7:
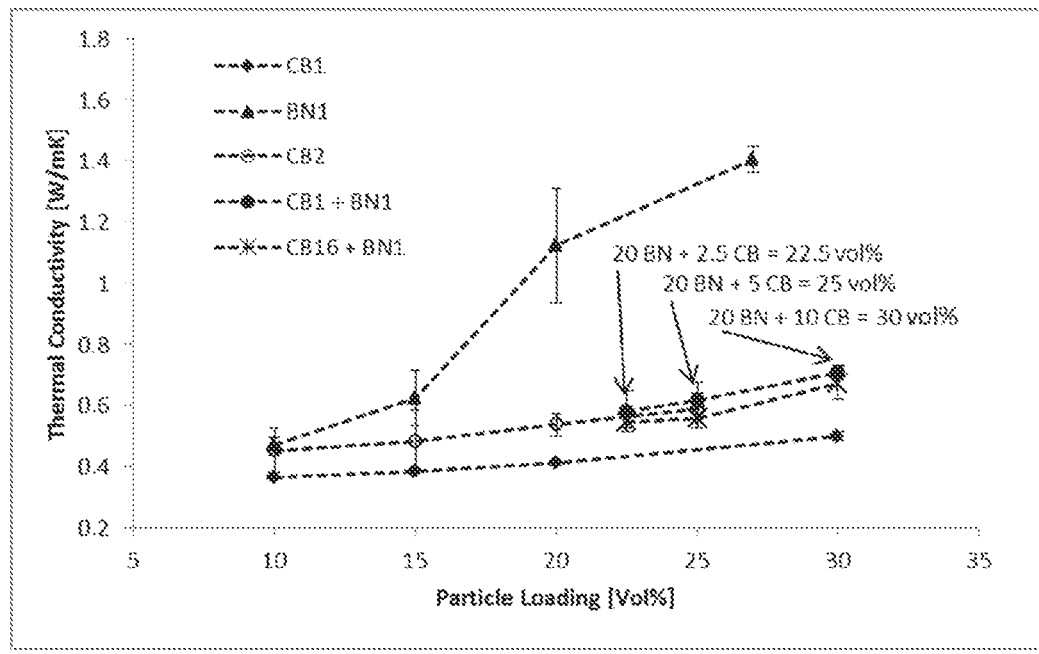
FIG. 7 provides a graph illustrating the thermal conductivity of the polymer composites of FIG. 6 as well as two comparative examples that include both boron nitride and carbon black particles.

FIG. 7 adds in some of the composites that include two different particle types. The combination of CB1 and BN1 as well as the combination of CB16 and BN1 are plotted. It can be seen from the plot that the combination of these carbon blacks and the boron nitride actually reduces the thermal conductivity when compared to BN by itself. Each of the particle ratios that were tried (20+2.5, 20+5, and 20+10) provided lower thermal conductivity than just 20 vol % BN. This means that in combination with boron nitride, these carbon blacks reduce the thermal conductivity of the composite compared to the composite with only boron nitride and no carbon blacks.

Figure 8:
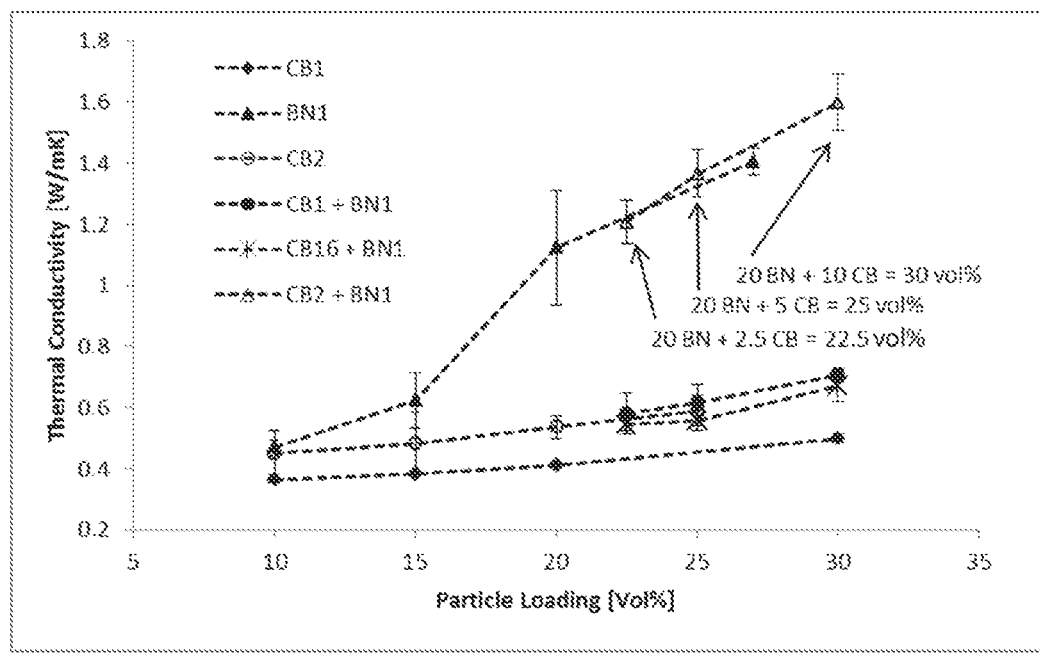
FIG. 8 provides a graph illustrating the thermal conductivity of the polymer composites of FIG. 7 as well as a third embodiment of a polymer composite that includes a highly thermally conductive particle and a partially crystallized carbon black particle.

FIG. 8 adds in the polymer composite that includes a mixture of BN and partially crystallized carbon black. In this case, the addition of carbon black CB2 improves the thermally conductivity over BN alone. The BN1-CB2 combination provides better thermal conductivity in the polymer composite than the thermal conductivity that would be expected by adding together the thermally conductivity contributions that each component particle provides on its own. The BN1-CB2 combination contributes a greater amount to thermal conductivity than does an equivalent volume percent of pure BN. For example, at total particulate volumes of greater than 25%, the trend lines show that the BN1-CB2 combination provides better thermal conductivity than an equivalent amount of BN1 only. Thus, by substituting a portion of the BN in a composite with a partially crystallized carbon black, cost can be reduced while actually increasing thermal conductivity. This is illustrated for ratios (by volume) of BN to CB of 2:1, 4:1 and 8:1 at total particulate loadings of 30 volume %, 25 volume % and 22.5 volume %.

Example 4—Thermal Conductivity Measurements

Composites were prepared according to the compositions listed in Table 6 below, using Zytel ST7301NC polyamide 6 from Dupont as the polymer. BN2 is Platelets 15/400 boron nitride available from 3M. The composites were mixed in a APV twin screw extruder supported by Baker Perkins having a screw diameter of 27 mm and a length/diameter ratio of 40.5 and cooled with a water bath. A #2 screw was used and the extruder was operated at 300 rpm with an output rate of 8 kg/hr for two strands. Zones 2, 3, and 9 were maintained at 250° C., zone 4 at 260° C. and zones 5-8 at 270° C. The melt die ranged between 260 and 272° C. Vent port 1 was open to the atmosphere, vent port 2 was closed, and vent port 3 was maintained under vacuum. The torque ranged between 33 and 40% except for the sample with 30 vol % BN1, for which the torque was not stable. Thermal conductivity and volume resistivity were measured as described in Example 3 and are also listed in Table 6 below. Mass flow index (MFI) was measured according to ASTM D1238 (275° C./5 kg for all samples except neat polymer, for which 275° C./2.16 kg).

TABLE 6

| Grade | Volume % | Avg. TC [W/mK] | Avg. ST. DEV [W/mK] | MFI |
|---|---|---|---|---|
| CB 1 + BN1 | CB1 5; BN1 20 | 0.611 | 0.042 | 11.5 |
| CB 1 + BN1 | CB1 10; BN1 20 | 0.649 | 0.049 | 0.8 |
| BN1 | 20 | 0.511 | 0.030 | 36.8 |
| BN1 | 30 | 0.785 | 0.027 | 6.0 |
| BN1 | 35 | 0.892 | 0.017 | 2.1 |
| CB2 + BN1 | CB2 5; BN1 20 | 0.636 | 0.030 | 13.3 |
| CB2 + BN1 | CB2 10; BN1 20 | 0.761 | 0.016 | 0.8 |
| CB2 + BN2 | CB2 10; BN2 20 | 0.845 | 0.020 | 1.0 |
| No CB |  | 0.301 | 0.029 | 26.9 |
| CB2 | 25 | 0.705 | 0.032 | — |
| CB2 | 30 | 0.814 | 0.027 | 0 |
| CB1 | 30 | 0.581 | 0.015 | 0 |

In addition, composites were produced using the HDPE of Example 3 but the mixing methods of Example 4, using 20 vol % BN1 and 5 vol % CB2, to achieve a thermal conductivity of 1.116+/−0.030 W/mK. This is less than the thermal conductivity of the same composite produced using the method of Example 3. Without being bound by any particular theory, it is believed that the higher shear imparted by the twin screw extruder in Example 4 may have fractured some of the boron nitride platelets, reducing thermal conductivity in comparison to the composite produced using the lower shear Brabender mixer in Example 3.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents and patent applications and publications that are cited or referred to in this application are incorporated in their entirety herein by reference.

The invention claimed is:

1. A thermoplastic composite polymer composition comprising:
    greater than 50% by weight of a polymer matrix; and
    a partially crystallized furnace carbon black dispersed in the polymer matrix at a concentration of from 12 to 28 percent by weight, wherein the carbon black has an OAN structure of greater than 120 $cm^3/100$ g and less than 200 $cm^3/100$ g, a surface energy of less than 8 $mJ/m^2$, a percent crystallinity of less than 65% and a Raman microcrystalline planar size ($L_a$) of greater than or equal to 28 Å.

2. The thermoplastic composite polymer composition of claim 1, wherein the partially crystallized furnace carbon black is formed by thermally treating a furnace black at a temperature greater than 700° C. and less than 1800° C.

3. The thermoplastic composite polymer composition of claim 1, wherein the polymer matrix comprises a copolymer or terpolymer.

4. The thermoplastic composite polymer composition of claim 1, wherein the polymer matrix comprises a polyolefin, a polystyrene, a polycarbonate, a polyamide, and/or a polyamine.

5. The thermoplastic composite polymer composition of claim 1, further comprising a non-carbonaceous particle having a thermal conductivity of greater than 30 W/mK.

6. The thermoplastic composite polymer composition of claim 5, wherein the non-carbonaceous particle is selected from BN, MgO, ZnO, and $Al_3O_2$.

7. The thermoplastic composite polymer composition of claim 6, wherein the non-carbonaceous particle comprises BN, and wherein the volume ratio of partially crystallized carbon black to BN is in the range of 1:1 to 1:10.

8. The thermoplastic composite polymer composition of claim 1, wherein the thermal conductivity of the thermoplastic composite polymer composition is at least 1.6× greater than the thermal conductivity of the polymer matrix.

9. The thermoplastic composite polymer composition of claim 1, wherein the partially crystallized furnace carbon black improves a thermal conductivity of the thermoplastic composite polymer composition at least 10% with respect to an untreated carbon black.

10. A masterbatch comprising the thermoplastic composite polymer composition of claim 1.

11. A product comprising the composite polymer composition of claim 1, wherein the product is selected from wire and cable jacketing, 3D printed products, automotive parts, and LED casings and fixtures.

12. A polymer precursor composition comprising:
    greater than 50% by weight of a polymer precursor comprising a polymerizable monomer or oligomer; and
    a partially crystallized furnace carbon black dispersed in the monomer or oligomer at a concentration of from 12 to 28 percent by weight, wherein the carbon black has an OAN structure of greater than 120 $cm^3/100$ g and less than 200 $cm^3/100$ g, a surface energy of less than 8 $mJ/m^2$ and a Raman microcrystalline planar size ($L_a$) of greater than or equal to 28 Å.

13. The polymer precursor composition of claim 12 wherein the polymer precursor comprises a precursor of a polymer selected from thermoplastic polyolefins (TPO), polyethylene (PE), linear low density (LLDPE), low density (LDPE), medium density (MDPE), high density (HDPE), ultra-high molecular weight (UHMWPE), very low density polyethylene (VLDPE), metallocene medium density polyethylene (mLLDPE), polypropylene, copolymers of polypropylene, ethylene propylene rubber (EPR), ethylene propylene diene terpolymers (EPDM), acrylonitrile butadiene styrene (ABS), acrylonitrile EPDM styrene (AES), styrene-butadiene-styrene (SBS), polyoxymethylene (POM), polyamides (PA) polyvinylchloride (PVC), tetraethylene hexapropylene vinylidenefluoride polymers (THV), perfluoroalkoxy polymers (PFA), polyhexafluoropropylene (HFP), polyketones (PK), ethylene vinyl alcohol (EVOH), copolyesters, polyurethanes (PU), thermoplastic polyurethanes, polystyrene (PS), polycarbonate (PC), polybutylene terephthalate (PBT), polyethylene terephthalate (PET), polypheneylene oxide (PPO), polyphenylene ether (PPE), an acrylic, an epoxy, silicone, a phenolic resin, a polyimide, a plastisol, and polyvinyl acetate.

14. The polymer precursor composition of claim 12, wherein the precursor comprises a precursor of a polyolefin, a polystyrene, a polycarbonate, a polyamide, and/or a polyamine.

15. The polymer precursor composition of claim 12, further comprising a non-carbonaceous particle having a thermal conductivity of greater than 30 W/mK.

16. The polymer precursor composition of claim 15, wherein the non-carbonaceous particle is selected from BN, MgO, ZnO, and $Al_3O_2$.

17. The polymer precursor composition of claim 16, wherein the non-carbonaceous particle comprises BN, and wherein the volume ratio of partially crystallized carbon black to BN is in the range of 1:1 to 1:10.

18. The polymer precursor composition of claim 12, wherein following polymerization, a thermal conductivity of the polymerized polymer precursor composition is at least 1.6×greater than the thermal conductivity of a polymerizate of the polymer precursor.

19. The polymer precursor composition of claim 12, wherein the partially crystallized furnace carbon black improves a thermal conductivity of a polymerizate of the polymer precursor composition by at least 10% with respect to an untreated carbon black.

* * * * *